United States Patent [19]

Hutchison

[11] Patent Number: 5,234,372

[45] Date of Patent: Aug. 10, 1993

[54] TENDON EXTRACTION SYSTEM

[76] Inventor: Louis C. Hutchison, 3300 Meade Ave., Las Vegas, Nev. 89102

[21] Appl. No.: 910,613

[22] Filed: Jul. 8, 1992

Related U.S. Application Data

[63] Continuation-in-part of Ser. No. 512,885, Apr. 23, 1990, Pat. No. 5,133,688.

[51] Int. Cl.$^5$ ............................................. A22C 21/06C
[52] U.S. Cl. .................... 452/172; 452/136; 426/272
[58] Field of Search ............ 452/172, 136, 135; 426/272

[56] References Cited

U.S. PATENT DOCUMENTS

| | | | |
|---|---|---|---|
| 584,381 | 6/1897 | Lowndes | 452/172 |
| 1,912,124 | 5/1933 | Braumuller | 452/172 |
| 2,068,137 | 1/1937 | Jaeger | 452/172 |
| 5,108,344 | 4/1992 | Debey | 452/135 |
| 5,133,688 | 7/1992 | Hutchinson | 452/136 |

Primary Examiner—Willis Little
Attorney, Agent, or Firm—Thorpe, North & Western

[57] ABSTRACT

A processed food item utilizing a complete tenderloin section of a turkey having an approximate full length as naturally exists for this portion of the turkey, comprising a single cut of meat having a single, uniform extraction cut extending substantially along the full length of the tenderloin section, said cut being formed in an arcuate cross-section around an internal portion of the tenderloin which included an associated tendon which has been completely severed from the tenderloin by such single extraction cut. Also described is a food item processed from the tenderloin in the form of dried jerky.

4 Claims, 2 Drawing Sheets

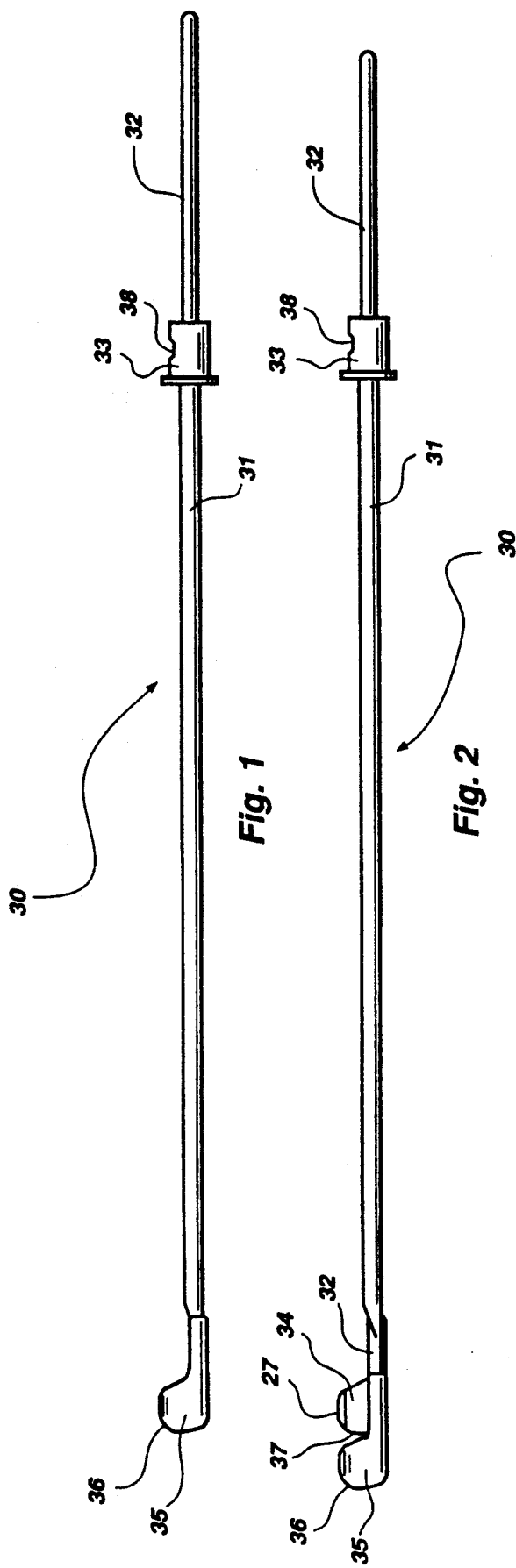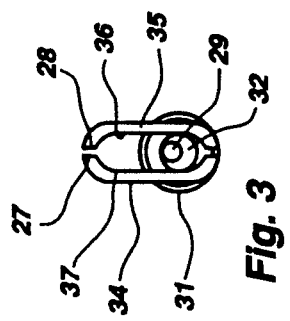

TENDON EXTRACTION SYSTEM

This application is a continuation-in-part of a pending patent application filed on Apr. 23, 1990 under Ser. No. 07/512,885, now issued under U.S. Pat. No. 5,133,688.

BACKGROUND OF THE INVENTION

(2) Field of the Invention

This invention relates to food products manufactured from a turkey tenderloin, and more particularly from a turkey tenderloin which has had its tendon extracted from its surrounding muscle tissue.

(2) Description of Related Art

The inherent existence of unsightly, tough, unpalatable, and difficult to remove tendons in various muscles and/or cuts of meat and poultry has created expensive and difficult problems for decades. The inability to remove tendons from particular cuts of meat and poultry in a satisfactory and economical manner has relegated many of the most tender, succulent, and desirable cuts thereof to the less desirable and least demanded of meat or poultry products. A primary example of the above problems is the tenderloin of a turkey. Although it includes a tender and desirable portion of white breast meat, a large undesirable tendon extends directly through a major portion of the tenderloin.

There are presently only two methods being employed to remove tendons to improve the desirability of the meat products. The first method is to manually cut or trim the tendon from the meat with a knife. This method is tedious and time consuming, and therefore uneconomical. Also, when the tendon is removed in this manner, the meat is most generally separated into distinct pieces or portions, no longer maintaining its original integrity as a single portion, muscle or cut of meat.

The second presently used method has not been applied to the tenderloin of turkey but is used with tendons in limb of a fowl. It is simply to grab the tendon next to the bone with a pair of pliers and tear the tendon away. U.S. Pat. No. 584,381 to Lowndes discloses a pair of pliers adapted for this purpose. This method, if applied to a turkey tenderloin may be faster, more economical, and easier than the trimming method described above; however, it also leaves the cut of meat substantially torn into distinct pieces or portions. Since neither of the above methods for removing a tendon from a cut of meat leaves the cut intact as a single portion, the appearance, desirability and usefulness of the meat is greatly compromised. Also, because of the meat industry's inability to remove such tendons in a satisfactory manner, certain cuts of meat such as turkey tenderloins must be sold at a reduced price, or must be reduced to smaller portions by removing the tendon(s). These must then be sold in the smaller and irregularly shaped portions, thus limiting the usefulness thereof and reducing the market price.

Because of the greater desirability of intact, tendinous cuts of meat, there exists a long felt need for a single portion of turkey tendon with the cut of meat itself being substantially unaffected.

SUMMARY OF THE INVENTION

It is an object of the invention to provide a cut of tenderloin turkey meat having its tendon removed but having the remainder of the cut of meat intact.

Another object of the present invention is to provide an intact cut of turkey tenderloin which further processed to specific end products including turkey jerky.

The above and other objects of the invention are realized in a specific illustrative embodiment of a processed tenderloin which utilizes a complete tenderloin section of a turkey having an approximate full length as naturally exists for this portion of the turkey and includes a single cut of meat having a single, uniform extraction cut extending substantially along the full length of the tenderloin section, said cut being formed in an arcuate cross-section around a internal portion of the tenderloin which included an associated tendon which has been completely severed from the tenderloin by such single extraction cut. A specific form of processed product in the form of turkey jerky is also disclosed.

BRIEF DESCRIPTION OF THE DRAWINGS

The present invention will be further illustrated by reference to the following detailed description taken in conjunction with the accompanying drawings in which:

FIG. 1 is a side view of the shear rod assembly of the tubular blade apparatus used for extracting the turkey tendon.

FIG. 2 is a side view of the shear rod assembly of FIG. 1 with the blades in an open position;

FIG. 3 is an end view of the shear rod assembly of FIG. 1 ;

Figure 4:
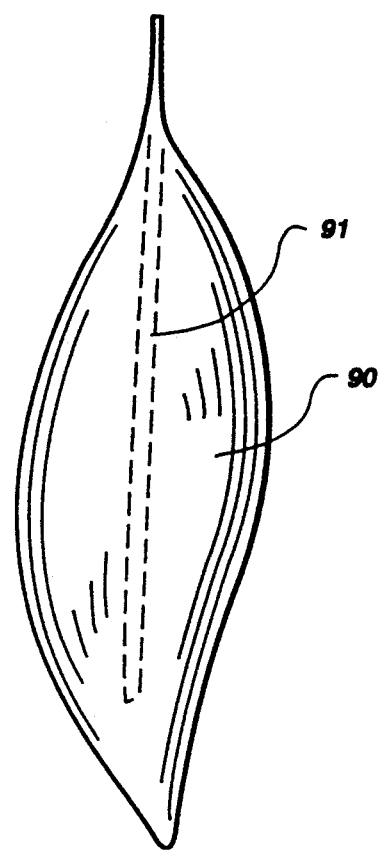
FIG. 4 is a perspective view of a cut of turkey tenderloin showing the general location of the tendon portion.
Figure 5:
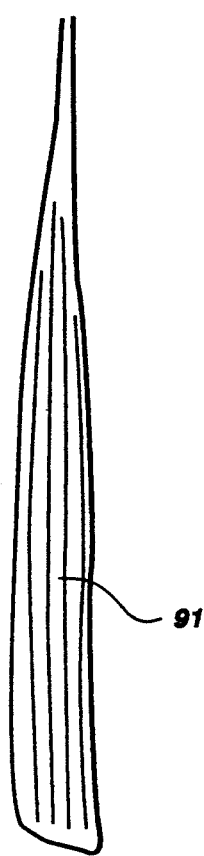
FIG. 5 is a perspective view of the tendon.

DESCRIPTION OF THE PREFERRED EMBODIMENTS AND BEST MODE FOR CARRYING OUT THE INVENTION

The tendon extractor system of the present invention is the subject matter of a parent patent application as referenced earlier (incorporated herein by reference) and includes a shear rod assembly 30 having blades 34 and 35 for separating the tendon from the muscle tissue of the meat. This shear rod assembly 30 includes a tubular outer shear rod 31 and a solid inner shear rod 32 which can move linearly therein. Outer shear rod 31 has a blade 34 attached to its distal end having cutting edge 37, and has attached to its proximal end, the mounting ring 33 which has notch 38 for securely attaching it to a mounting block as described in the parent case. The inner shear rod 32 has attached to its distal end a blade 35 having cutting edge 36. As best seen in FIG. 3, blades 34 and 35 are of generally C-shaped configuration, and when placed in the closed position as shown in FIG. 1, where the surfaces 27 and 28 are directly adjacent each other, the cutting edges 36 and 37 form an annular or oval, tubular-shaped cutting surface.

As can be seen in FIG. 2, when the blades 34 and 35 are in the open position, a tendon extending from a portion of a cut of meat (such as a tendon 91 extending from out of meat 90 as shown in FIG. 4) can be easily placed between the blades 34 and 35. When a tendon is thus located, inner rod 32 is retracted through outer rod 31 and the blades 34 and 35 come to the closed position as shown in FIG. 1. Thus, the split blade assembly 30 allows for easy placement of a tendon in the correct position in between cutting blades 36 and 37 without the manipulation required to thread a tendon through the oval-shaped opening.

The extraction occurs as the meat is first pulled against the blades 34 and 35 causing blade 35 to move to its closed position, then cutting edges 36 and 37 cut into the meat and remove the muscle tissue directly adjacent the exterior surface of the tendon. Once the tendon is separated it can be easily extracted from the cut of meat 90 by pulling the meat away from the blade assembly 30. After this process is complete, the only visible change to the cut of meat 90 is an incision opening 92. The remainder of the cut of meat remains completely intact. The interior cut is now exposed as an exterior surface, providing a thinner fillet.

The very clean and complete removal of the tendon 91 from its surrounding muscle tissue is possible because of the close placement of the cutting edges 36 and 37 to the surface of the tendon 91, and because of the relative toughness of the tendon 91 with respect to the surrounding muscle tissue. The edges 36 and 37 of the blade pass along the surface of tendon 91, yet cut away only the much softer muscle tissue leaving the tendon 91 itself uncut. The newly cut interior of the tenderloin has a uniform, smooth surface.

Some cuts of meat may require the use of other blade configurations as explained in the parent case in order to effectively remove all the tendinous material from the cut of meat. For example, large tendons extending into the tissue of the meat may be removed by the tubular blade apparatus 20 and then a linear blade apparatus may be used to remove other tendons which extend only a short distance into the muscle tissue or which lie along the surface thereof.

As can be readily seen, the blades of the tubular blade assemblies can be sized to accommodate varying sizes of tendons in various cuts of meat. As also can be readily seen, the size of the blades also dictates how much of the meat tissue is removed along with the tendon, or alternatively, how much of the tendon gets cut away from the major portion of the tendon and remains in the meat tissue. Those of ordinary skill in the art will therefore be able to adjust the blade size in order to generate the desired finished product based on the percentage of meat tissue remaining on the removed tendon, and/or on the amount of tendon remaining in the meat tissue after the majority of the tendon is removed. The decision as to the type and size of blade used to remove tendons from the cut of meat is therefore based upon the intended final use of the meat product.

A particular use which is unique for the tenderloin of the turkey is as a filet. Because the tenderloin has not heretofore been preserved in its integral condition following removal of the tendon, it has not been possible to serve the whole tenderloin cut (without tendon) as a single piece of turkey steak. The clean and complete extraction of the tendon in accordance with the present invention now enables this most favorable portion of a turkey to be served as a gourmet food without limitation. This is a significant advance in the art because the tenderloin is not only one of the more favorable parts of the turkey, but it also tends to retain its integrity better during food preparation as compared to other parts of the turkey. For example, the breast of a turkey is comprised of multiple layers which tend to fall apart during preparation. Accordingly, whereas some turkey parts need to be compressed or compacted, but the tenderloin can be served in a natural state with all of its meat juices and natural texture.

An additional form of processed meat for this tenderloin which is somewhat surprising is its use as jerky. Although jerky has been well known with respect to beef products, its application beyond red meat is unknown to this inventor, and to the jerky or meat snack industry. Jerky has traditionally been prepared based on techniques disclosed by the American Indian for purposes of providing an edible meat product which does not require a special storage environment. Today, these techniques have been commercialized to provide a jerky snack used by hikers, backpackers, etc., and has developed a substantial volume of sales activity.

Although there has been general acceptance of beef jerky, a corresponding product using turkey meat has not achieved commercial acceptance. More importantly, the inventor is unaware of the tenderloin of turkey as the source for such processing. There appear to have been attempts to commercialize a form of turkey jerky; however, the processed product was apparently unsatisfactory. This may have been in part because of use of dark meat, which follows the traditional perception that jerky is best made from that meat which is "red" meat. The general use of "white" turkey meat may have been impractical because of the low moisture content of most white meat and its incompatibility with curing processes used to prepare jerky. The differences in grain and general physical make up may also be a factor in the lack of prior art use of the breast portion as a source of jerky. There at least seems to be a perception that white meat is not practical or appealing in the form of jerky.

Figure 6:
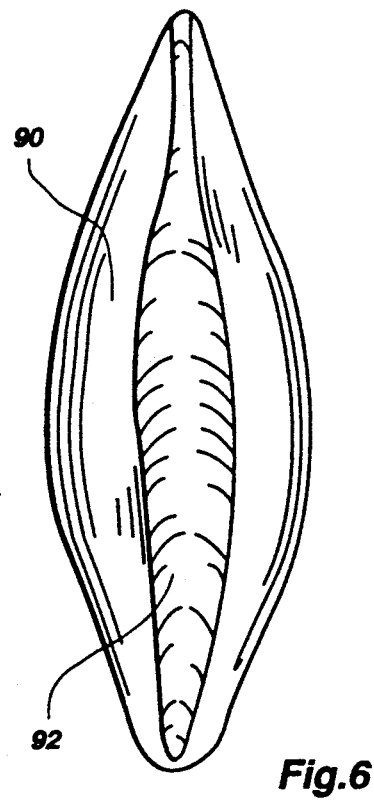
FIG. 6 is perspective view of the cut of meat as shown after the tendon has been removed by one of the removal processes of the invention.
Figure 7:
FIG. 7 is a perspective view of a processed piece of tenderloin in accordance with the present invention.

The present inventor has discovered that the tenderloin has unique and unexpected physical characteristics that facilitate its processing to a jerky product. For example, the tenderloin is a single muscle mass which can retain its integral structure during processing, unlike the whole turkey breast. Furthermore, the extraction process of the present invention enables the tenderloin to be price competitive with beef for jerky processing as a snack food. From a health perspective, the white turkey meat of the tenderloin is much healthier as compared to beef, based on a lower fat and cholesterol content. Accordingly, the cut tenderloin as shown in FIG. 6 can be processed in accordance with conventional processes to form a dried jerky product. It can then be cut to snack size product 95 as is shown in FIG. 8.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

I claim:

1. A processed food item utilizing a complete tenderloin section of a turkey and having an approximate full length as naturally exists for this portion of the turkey, said item comprising a single cut of meat having a single, uniform extraction cut extending substantially along the full length of the tenderloin section, said cut being formed in an arcuate cross-section around an internal portion of the tenderloin which included an associated tendon which has been completely severed from the tenderloin by such single extraction cut.

2. A food item as defined in claim 1, wherein the extraction cut extends to an exterior surface of the tenderloin for substantially the full length of the tenderloin section, thereby forming a tenderloin filet which is thinner and wider than a naturally occurring tenderloin of turkey and which also includes a smooth face of internal meat which is exposed as an exterior surface of the food item by reason of the uniform linear incision.

3. A food item as defined in claim 1, wherein the cut tenderloin section is further processed to a dried condition of jerky meat.

4. A food item as defined in claim 1, said cut being formed in an arcuate cross-section.

* * * * *